US010129836B2

(12) United States Patent
Prytz et al.

(10) Patent No.: US 10,129,836 B2
(45) Date of Patent: Nov. 13, 2018

(54) NETWORK NODE AND METHOD FOR MANAGING MAXIMUM TRANSMISSION POWER LEVELS FOR A D2D COMMUNICATION LINK

(71) Applicant: Telefonaktiebolaget L M Ericsson (publ), Stockholm (SE)

(72) Inventors: Mikael Prytz, Rönninge (SE); Joachim Sachs, Sollentuna (SE); Yngve Selén, Uppsala (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 382 days.

(21) Appl. No.: 14/429,246

(22) PCT Filed: Sep. 19, 2012

(86) PCT No.: PCT/SE2012/050990
§ 371 (c)(1),
(2) Date: Mar. 18, 2015

(87) PCT Pub. No.: WO2014/046579
PCT Pub. Date: Mar. 27, 2014

(65) Prior Publication Data
US 2015/0257113 A1    Sep. 10, 2015

(51) Int. Cl.
*H04W 52/38* (2009.01)
*H04W 72/08* (2009.01)
(Continued)

(52) U.S. Cl.
CPC ....... *H04W 52/383* (2013.01); *H04W 72/082* (2013.01); *H04W 76/14* (2018.02);
(Continued)

(58) Field of Classification Search
CPC . H04W 72/00; H04W 72/044; H04W 72/042; H04W 72/085; H04W 72/0473;
(Continued)

(56) References Cited

U.S. PATENT DOCUMENTS 8,060,105 B2    11/2011  Jung et al.
2006/0168343 A1*  7/2006  Ma ..................... H04W 52/38
                                                              709/245

(Continued)

FOREIGN PATENT DOCUMENTS

EP    2012443 A2    1/2009
EP    2384064 A1    11/2011
(Continued)

OTHER PUBLICATIONS

International Search Report and Written Opinion for PCT/SE2012/050990, dated Dec. 13, 2012, 9 pages.
(Continued)

*Primary Examiner* — Hoang-Chuong Q Vu
(74) *Attorney, Agent, or Firm* — Withrow & Terranova, PLLC

(57) ABSTRACT

A network node and a method therein for managing a device-to-device, D2D, communication link between a first device and a second device are disclosed. The network node determines a threshold value based on interference information relating to interference of the first device. The threshold value indicates an upper limit for allowable transmit power of the first device when transmitting on the D2D communication link. Then, the network node sends the threshold value to the first device. Subsequently, the network node receives, from the first device, a message indicating that power of transmission, by the first device, on the D2D communication link exceeds the threshold value.

22 Claims, 2 Drawing Sheets

(51) Int. Cl.
*H04W 76/14* (2018.01)
*H04W 52/36* (2009.01)
*H04W 84/18* (2009.01)
*H04W 92/18* (2009.01)

(52) U.S. Cl.
CPC .......... *H04W 52/367* (2013.01); *H04W 84/18* (2013.01); *H04W 92/18* (2013.01)

(58) Field of Classification Search
CPC . H04W 76/023; H04W 24/00; H04W 52/383; H04W 28/0236; H04W 36/20; H04W 40/16; H04W 52/244; H04W 72/082
See application file for complete search history.

(56) References Cited

U.S. PATENT DOCUMENTS

| | | | | |
|---|---|---|---|---|
| 2006/0188004 | A1* | 8/2006 | Kizu | H04B 1/715 375/132 |
| 2008/0069063 | A1* | 3/2008 | Li | H04W 88/06 370/338 |
| 2009/0010186 | A1* | 1/2009 | Li | H04W 52/383 370/310 |
| 2009/0011770 | A1* | 1/2009 | Jung | H04L 5/0037 455/452.1 |
| 2009/0017850 | A1* | 1/2009 | Jovicic | H04W 52/34 455/501 |
| 2009/0296635 | A1* | 12/2009 | Hui | H04W 48/10 370/328 |
| 2009/0325625 | A1* | 12/2009 | Hugl | H04W 52/16 455/522 |
| 2009/0325626 | A1 | 12/2009 | Palanki et al. | |
| 2011/0019596 | A1* | 1/2011 | Li | H04W 72/08 370/281 |
| 2011/0066738 | A1* | 3/2011 | Richardson | H04W 72/02 709/229 |
| 2011/0195731 | A1* | 8/2011 | Jang | H04W 52/243 455/501 |
| 2011/0228666 | A1* | 9/2011 | Barbieri | H04W 76/023 370/216 |
| 2011/0275382 | A1 | 11/2011 | Hakola et al. | |
| 2011/0312331 | A1 | 12/2011 | Hakola et al. | |
| 2012/0064935 | A1 | 3/2012 | Hakola et al. | |
| 2012/0282889 | A1* | 11/2012 | Tanaka | H04J 11/0053 455/405 |
| 2013/0064214 | A1* | 3/2013 | Patil | H04L 1/0002 370/330 |
| 2013/0252621 | A1* | 9/2013 | Dimou | H04W 72/082 455/450 |
| 2013/0273926 | A1* | 10/2013 | Peng | H04B 7/15528 455/450 |
| 2013/0294296 | A1* | 11/2013 | Dimou | H04W 72/082 370/280 |
| 2014/0141789 | A1* | 5/2014 | Tarokh | H04W 72/02 455/450 |
| 2014/0185529 | A1* | 7/2014 | Lim | H04W 76/023 370/328 |
| 2014/0314039 | A1* | 10/2014 | Jang | H04W 76/023 370/329 |
| 2014/0378150 | A1* | 12/2014 | Li | H04W 52/46 455/450 |
| 2015/0117239 | A1* | 4/2015 | Lindoff | H04W 72/08 370/252 |
| 2015/0117366 | A1* | 4/2015 | Stupar | H04W 24/10 370/329 |
| 2015/0223217 | A1* | 8/2015 | Chen | H04W 72/00 370/329 |
| 2015/0296443 | A1* | 10/2015 | Lim | H04W 48/12 370/312 |
| 2015/0373616 | A1* | 12/2015 | Fujishiro | H04L 1/1854 370/328 |
| 2016/0080954 | A1* | 3/2016 | Hedayat | H04B 17/318 370/252 |

FOREIGN PATENT DOCUMENTS

| | | |
|---|---|---|
| RU | 2420038 C2 | 5/2011 |
| RU | 2010126228 A | 1/2012 |
| WO | 2011050921 A1 | 5/2011 |
| WO | 2012015698 A1 | 2/2012 |
| WO | 2012066433 A1 | 5/2012 |
| WO | 2014046579 A1 | 3/2014 |

OTHER PUBLICATIONS

Official Action of Formal Examination for Russian Patent Application No. 2015114549, dated May 27, 2015, 4 pages.
Translation of Notification for Russian Patent Application No. 2015114549, dated Oct. 12, 2016, 3 pages.
Official Action of Substantive Examination for Russian Patent Application No. 2015114549/08, dated Jun. 1, 2016, 8 pages.
Decision of Grant for Russian Patent Application No. 2015114549/08, dated Apr. 7, 2017, 13 pages.
Patent Examination Report No. 1 for Australian Patent Application No. 2012390351, dated Aug. 27, 2015, 3 pages.
Patent Examination Report No. 2 for Australian Patent Application No. 2012390351, dated Jan. 11, 2016, 6 pages.

* cited by examiner

NETWORK NODE AND METHOD FOR MANAGING MAXIMUM TRANSMISSION POWER LEVELS FOR A D2D COMMUNICATION LINK

This application is a 35 U.S.C. § 371 national phase filing of International Application No. PCT/SE2012/050990, filed Sep. 19, 2012, the disclosure of which is incorporated herein by reference in its entirety.

TECHNICAL FIELD

Embodiments herein relate to a wireless communication network, such telecommunication network, which employs Device-to-Device (D2D) communication for devices in the wireless communication network. A network node and a method therein for managing a D2D communication link are disclosed.

BACKGROUND

A known cellular communication network employs so called network assisted D2D communication, also referred to as Machine-to-Machine (M2M) communication, between user equipments. Thanks to the D2D communication, load on the cellular communication network may be reduced. The load can be measured in terms of for example radio resource usage, traffic between a base station and a user equipment. In particular, load on the radio base station, comprised in the cellular communication network, may be reduced.

With the network assisted D2D communication, two user equipments are allowed to use licensed spectrum resources to communicate directly with one another via a so called D2D link. In contrast, with cellular communication methods, data is transmitted between the two user equipments via the radio base station. The D2D link connects the two user equipments directly, without passing user data via the radio base station. Hence, the radio base station is off loaded.

After the D2D link has been established, the two user equipments may control power for transmission on the D2D link in order to ensure that the D2D link remains reliable. However, since the two user equipments may move around, the D2D link may degenerate. Moreover, the two user equipments may cause other links of the cellular communication network to degenerate.

US2011/0312331 discloses a method for resources scheduling for network controlled D2D communications. A network node obtains a reference point with a fluctuation range based on at least one metric for a plurality of cellular user equipments and at least a pair of device-to-device (D2D) user equipments. The network node signals the reference point and the fluctuation range to the pair of D2D user equipments. Then, the network node allocates radio resources to the pair of D2D user equipments. Furthermore, the network node receives metric updates from the pair of D2D user equipments and the plurality of cellular user equipments. Next, the network node adjusts the reference point and the fluctuation range according to the received metric updates.

Disadvantageously, the D2D communication may degenerate as the pair of D2D user equipments move around.

SUMMARY

An object of embodiments herein is to more accurately manage a D2D communication link, which is controlled by a network node in a cellular radio communication system According to an aspect, the object is achieved by a method for managing a D2D communication link between a first device and a second device. The network node determines a threshold value based on interference information relating to interference of the first device. The threshold value indicates an upper limit for allowable transmit power of the first device when transmitting on the D2D communication link. Furthermore, the network node sends the threshold value to the first device. The network node receives, from the first device, a message indicating that power of transmission, by the first device, on the D2D communication link exceeds the threshold value.

According to another aspect, the object is achieved by a network node configured to manage a D2D communication link between a first device and a second device. The network node comprises a processing circuit configured to determine a threshold value based on interference information relating to interference of the first device. The threshold value indicates an upper limit for allowable transmit power of the first device when transmitting on the D2D communication link. Moreover, the processing circuit is configured to send the threshold value to the first device, and to receive, from the first device, a message indicating that power of transmission, by the first device, on the D2D communication link exceeds the threshold value.

According to embodiments herein, the network node determines the threshold value based on the interference information relating to interference of the first device. The interference of the first device may refer to interference towards the first device or to interference generated by the first device. Thanks to that the interference information is taken into account when the network node determines the threshold value, the D2D communication link may be more accurately controlled. Consider for example when the interference information relates to interference towards the first device, it may be preferred to have a relatively high threshold value in order to make Signal-to-interference-and-Noise (SINR) for the D2D link sufficiently high.

An advantage of embodiments herein is that the first and second devices are allowed to autonomously control power at the D2D link as long as the threshold value is not exceeded.

Moreover, embodiments herein ensure that interference do not cause a degenerated link, which may be a cellular radio communication link or a D2D.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
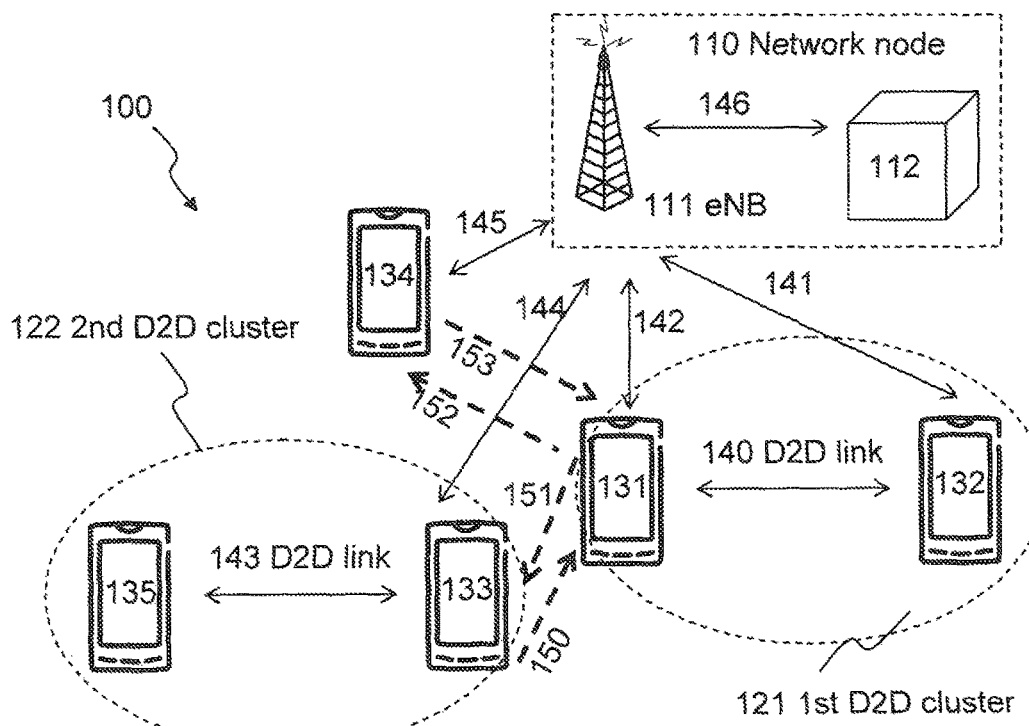
FIG. 1 is a schematic block diagram, which shows an exemplifying wireless communication network.

Throughout the following description similar reference numerals have been used to denote similar elements, network nodes, parts, items or features, when applicable.

FIG. 1 depicts an exemplifying wireless communications network 100 in which embodiments herein may be implemented. In this example, the wireless communications network 100 is a Long Term Evolution (LTE) network. In other examples, the wireless communication network 100 may be any Third Generation Partnership Project (3GPP) cellular radio communication network, such as a Wideband Code Division Multiple Access (WCDMA) network, a Global System for Mobile communication (GSM network) or the like. The wireless communication network 100 may manage D2D communication, often referred to as network assisted D2D communication.

The radio communication network 100 comprises a radio network node 111 and a core network node 112. The radio network node 111 may be an evolved Node B (eNB), a control node controlling one or more Remote Radio Units (RRUs), a radio base station, an access point or the like. The core network node 112 may be a Mobility Management Entity (MME), a Serving Gateway (SGW) node, a Packet Data Network Gateway (PDN Gateway or PGW), an Operation and Support System (OSS) or the like.

The radio network node 111 or the core network node 112 operates the network assisted D2D communication.

As used herein, the term "a network node 110" refers to the radio network node 111 and/or the core network node 112. Thus, giving a few examples, the actions presented herein may be performed by only the radio network node 111, by only the core network node 112 or some actions may be performed by the radio network node 111 and some actions may be performed by the core network node 112. In all these examples, the network node 110 is said to perform the actions. As a consequence, the network node 110 may be comprised in the wireless communication network 100, such as a cellular radio communication network.

Furthermore, a first device 131 and a second device 132 may be located in the vicinity of the network node 110. Expressed differently, the first device 131 and/or the second device 132 may be associated with the network node 110.

The first device 131 may communicate with the second device 132 over a D2D communication link 140. In some cases, when the D2D communication link is configured with a master and a slave unit, the first device 131 may be the master unit and the second device 132 may be the slave unit. The D2D communication link 140 is managed by the network node 110 via cellular radio communication links 141, 142 between the network node 110 and the respective device, i.e. the first or second device 131, 132. The radio communication links 141, 142 may be implemented over LTE-Uu and/or a Radio Resource Control (RRC) protocol, which are known from 3GPP terminology.

According to some embodiments, the first device 131 may be comprised in a first D2D cluster 121 managed by the network node 110 via the cellular radio communication link 142. The term "cluster" may refer to two or more devices connected to each other via D2D communication links.

Moreover, a third and a fourth device 133, 134 may be comprised in the wireless communication network 100. Furthermore, the network node 110 may manage the third and fourth devices 133, 134 via further cellular radio communication links 144, 145.

The third device 133 may be connected to a fifth device 135 via a further D2D link 143. The third and fifth devices 133, 135 may be comprises in a second D2D cluster 122. Interference 150, 151 between the first device 131 and the third device 133 may occur. This will be further elaborated below in conjunction with action 201.

The fourth device 134 may be connected to the network node 110 via a still further cellular radio communication link 145. Interference 152, 153 between the first device 131 and the fourth device 134 may occur. This will be further elaborated below in conjunction with action 201. Interference information may refer to interference towards the first device 131 and/or interference by the first device 131.

Throughout the present disclosure the term "a further device 133, 134" refers to the third device 133 and/or the fourth device 134.

As used herein, the term "device" may refer to a wireless device, a user equipment, a mobile phone, a cellular phone, a Personal Digital Assistant (PDA) equipped with radio communication capabilities, a smartphone, a laptop or personal computer (PC) equipped with an internal or external mobile broadband modem, a tablet PC with radio communication capabilities, a portable electronic radio communication device, a sensor device equipped with radio communication capabilities or the like. The sensor may be any kind of weather sensor, such as wind, temperature, air pressure, humidity etc. As further examples, the sensor may be a light sensor, an electronic switch, a microphone, a loudspeaker, a camera sensor etc.

Figure 2:
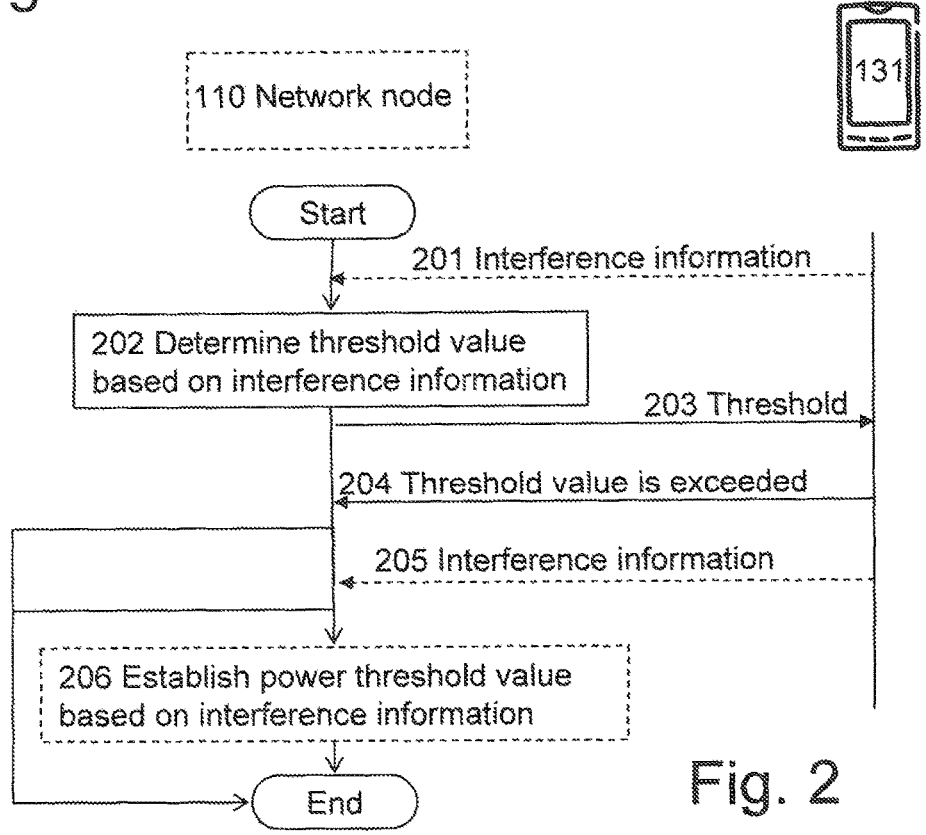
FIG. 2 is a schematic, combined signaling scheme and flowchart of embodiments of a method in the wireless communication network according to FIG. 1.

FIG. 2 illustrates an exemplifying method in the network node 110 for managing the D2D communication link 140 between the first device 131 and the second device 132.

The following actions may be performed in any suitable order.

Action 201

In order for the network node 110 to be aware of the interference information. the network node 110 may receive the interference information from the first device 131. The interference information may e.g. be received repeatedly according to a scheme, e.g. periodically, or in response to a request from the network node 110.

In some examples, the interference information may be measured by the first device 131, i.e. the first device 131 may measure reference signals, pilot signals, or the like, from the further device 133, 134.

The interference information may relate to co-channel interference. This means that the interference origins from signals transmitted on the same channel, e.g. time and frequency, as transmissions on the D2D communication link 140.

The interference information may comprise information relating to at least one of position of the first device 131, measured radio environment maps, and/or a path loss exponent indicating radio environment in the vicinity of the first device 131. The radio environment in the vicinity of the first device 131 may relate to one or more channels, e.g. radio channels, of the first device 131. The channels may connect the first device 131 with e.g. the second device 132 and/or the network node 110. As mentioned, now expressed somewhat differently, the channels may also relate to measurement of interference to/from e.g. the third and/or fourth devices 133, 134.

The position of the first device 131 may be measured in terms of a distance from the network node 110, typically the radio network node 111. For example, when the first device 131 is located far away from the radio network node 110, it may be beneficial to set, or determine, the threshold value to a relatively high value. In this manner, control signaling is reduced in terms of power and/or in terms of amount of signaling. The position of the first device 131 may be received in response to a positioning request. Furthermore, the position of the first device 131 may be estimated by a position of the first cluster of devices. The position of the first cluster may e.g. be calculated as an average of each respective position of the devices in the first cluster. Thus, the position of the first device 131 is approximated by the position of the first cluster.

The measured radio environment maps may have been measured, or collected, from statistics reported by devices managed by the network node. The maps may be stored as a database with information about radio environment for different geographical areas in the vicinity of the radio network node 110. The radio environment may be defined by different measures, such as path loss, reference signal received power or the like. The statistics and/or the database with information about radio environment may be similar to statistics used for Self Organizing Networks, cell planning and the like.

The path loss exponent may characterize radio environment in the vicinity of the first device 131. The path loss exponent may be measured by the first device 131 according to known procedures, such as by measuring a Reference Signal Received Power (RSRP) and determining a distance between the transmitter and receiver. The distance may be determined by e.g. position measurements according to known methods. The position of the first device 131 may also be used to determine which category of environment the first device 131 currently is in. Examples of category of environment are suburban area, shopping mall, indoor office, dense high-rise buildings, rural, etc. Next, a path loss exponent that is typical for that category of environment is selected by the network node 110.

As mentioned, the interference information may indicate interference 150, 153 towards the first device 131 and/or interference 151, 152 from the first device 131.

Similarly, the further device 133, 134 may be related to the interference 150, 151, 152, 153 in that the further device 133, 134 is exposed to the interference 151, 152 by the first device 131 or in that the further device 133, 134 causes interference 150, 153 towards the first device 131. Thus, the interference information may comprise information relating to the position of the first device 131 in relation to a position of the further device 133, 134 related to the interference 150, 151, 152, 153.

In some examples, the further device 133, 134, i.e. the third device 133, may be comprised in a further D2D cluster of devices, such the second cluster of devices. In this example, the further D2D cluster may be managed by the network node 110 via the cellular radio communication links 144.

As a further example, the further device 133, 134, i.e. the fourth device 134, may be connected to the network node 110 via the cellular communication link 145. In particular, the fourth device 134 may in this case not be connected via a D2D communication link to some further device. Hence, the fourth device 134 is involved in cellular communication only.

Action 202

In order to improve management of the D2D communication link 140, the network node 110 determines a threshold value based on the interference information relating to interference 150, 151, 152, 153 of the first device 131. The threshold value indicates an upper limit for allowable transmit power of the first device 131 when transmitting on the D2D communication link 140.

The allowable transmit power refers to that the first device 131 is allowed to autonomously control, in co-operation with the second device 132, transmit power at the D2D link without involvement by the network node 110.

In more detail, the threshold may be determined based on the interference information by calculating the threshold based on a first number of devices involved in D2D communication and/or a second number of devices involved in cellular communication via the network node 110 only. Furthermore, the calculation of the threshold may weigh the first and second numbers of devices while taking information about the position of the first device and/or the position of the further device 133, 134 into account. Here, the term "weigh" refers to e.g. mathematical weighting of a mean value. Moreover, the calculation of the threshold may take into account information about a channel between the first and second devices. The channel may for example be characterized by the path loss exponent.

According to an example, the threshold value may be equal to Pmax divided by a number of D2D clusters that have been allocated, by the network node 110, to the same radio resources. Pmax may refer to maximum transmit power that e.g. the first device 131 is designed to have or configured to use.

Furthermore, the threshold value may be equal to Pmax divided by a number of D2D clusters and a number of devices that have been allocated, by the network node 110, to the same radio resources. Hence, Pmax is determined by taking both devices involved in D2D communication, e.g. the number of D2D clusters, and devices involved in cellular communication only, e.g. the number of devices.

According to further examples, the threshold value may be predetermined, which may be advantageous, e.g., when the wireless communication network 100 is temporarily unavailable. The wireless communication network 100 may be unavailable to due public safety and/or national security scenarios. During times when the wireless communication network 100 is unavailable, it may be desired to continue, or start, the D2D communication. Hence, the threshold value may then be set to a predetermined value, such as a percentage of Pmax. The percentage may be 10%, 20% or the like. It shall be understood that it is assumed that the wireless communication network 100 may later be available to handle action 204 below.

Thanks to that the interference information is taken into account when setting, or determining, the threshold value, the threshold value is more accurately set. For example, when the interference is high, the threshold value may also be set to a relatively high value in order to obtain for example a sufficiently high SINR at the D2D communication link.

Likewise, when the interference is low, the threshold value may be set relatively low. Thereby, more resources, e.g. power, will be available for use by other clusters in D2D mode or other devices in cellular mode only.

In contrast, when considering interference from the first device 131, it may be preferred that the threshold value is deceased by the interference level expressed in dB.

In this manner, the network node 110 allows the first and second devices 131, 132 to autonomously configure, or manage, the D2D communication link as long as the threshold value is not reached, or exceeded. Therefore, less signaling between the network node 110 and the first device 131 is required.

Action 203

Then, the network node 110 sends the threshold value to the first device 131. In this manner, the first device 131 is informed about the threshold value. The threshold value is then used by the first device to trigger action 204.

Action 204

Subsequently, the network node 110 receives, from the first device 131, a message indicating that power of transmission, by the first device 131, on the D2D communication link 140 exceeds, or reaches, the threshold value. Hence, the first device 131 may have monitored transmit power of the first device 131 in view of the threshold value.

Action 205

The network node 110 may receive the interference information, i.e. updated interference information. In this manner, the interference information may be kept up to date. It may be that the network node 110 may wish to update the threshold value when the interference information has changed more than a specific threshold value as compared to when the interference information was last received as in e.g. action 201. This action is similar to action 201.

Action 206

The network node 110 may establish the threshold value based on the interference information, e.g. the updated interference information, in response to the reception of the message indicating that the threshold value has been exceeded.

Figure 3:
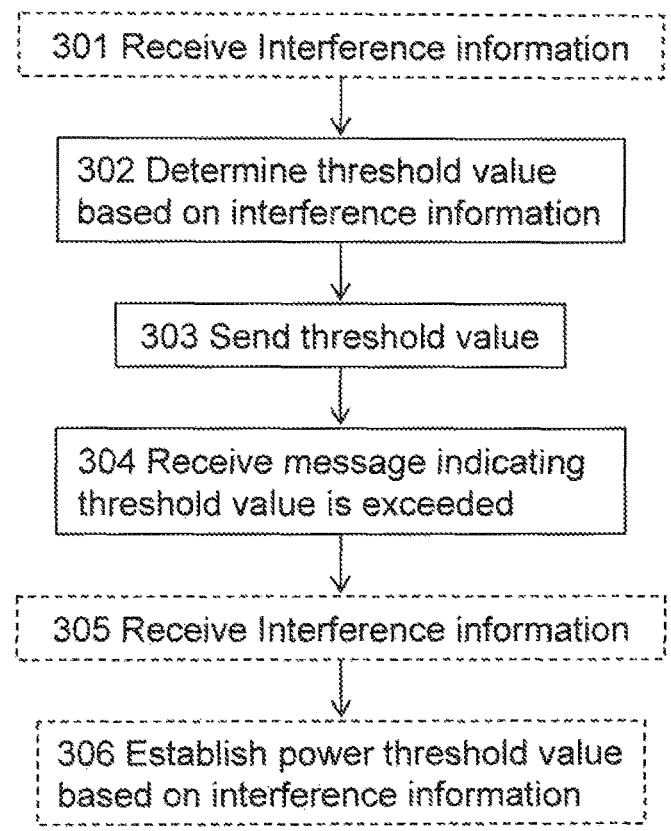
FIG. 3 is a schematic flowchart illustrating embodiments of a method in a network node.

FIG. 3 illustrates exemplifying embodiments of the method in the network node 110 of FIG. 2 when seen from the network node. Thus, the network node 110 performs a method for managing the D2D communication link 140 between the first device 131 and the second device 132.

As mentioned, the network node 110 may be comprised in the cellular radio communication system 100. The first device 131 may be comprised in the first D2D cluster 121 managed by the network node 110 via the cellular radio communication link 142.

The further device 133, 134 may be comprised in the further D2D cluster of devices 122. The further device 133, 134 may be connected to the network node 110 via the cellular communication link 145.

The following actions may be performed in any suitable order.

Action 301

The network node 110 may receive the interference information from the first device 131. This action is similar to action 201.

The interference information may comprise information relating to at least one of a position of the first device 131, measured radio environment maps, and/or a path loss exponent indicating radio environment in the vicinity of the first device 131. The interference information may relate to co-channel interference.

The interference information may comprise information relating to a position of the first device 131 in relation to a position of a further device 133, 134 related to the interference 150, 151, 152, 153.

The interference information may indicate interference 150, 153 towards the first device 131. The interference information may indicate interference 151, 152 from the first device 131.

Action 302

The network node 110 determines a threshold value based on interference information relating to interference 150, 151, 152, 153 of the first device 131. The threshold value indicates an upper limit for allowable transmit power of the first device 131 when transmitting on the D2D communication link 140. This action is similar to action 202.

Action 303

The network node 110 sends the threshold value to the first device 131. This action is similar to action 20.

Action 304

The network node 110 receives, from the first device 131, a message indicating that power of transmission, by the first device 131, on the D2D communication link 140 exceeds the threshold value. This action is similar to action 204.

Action 305

The network node 110 may receive the interference information from the first device 131. This action is similar to action 205.

Action 306

The network node 110 may establish the threshold value based on the interference information in response to the reception of the message indicating that the threshold value has been exceeded. This actor is similar to action 206.

Figure 4:
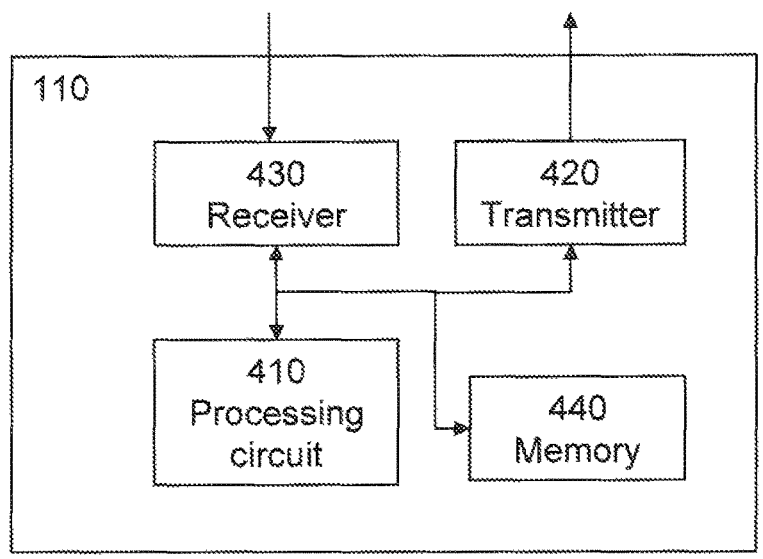
FIG. 4 is a schematic block diagram illustrating an exemplifying network node.

With reference to FIG. 4, a schematic block diagram of the network node 110 is shown. The network node 110 is configured to perform the methods in FIG. 2. The network node 110 is configured to manage the D2D communication link 140 between the first device 131 and the second device 132. The network node 110 may be comprised in the wireless communication network 100. The first device 131 may be comprised in the first D2D duster managed by the network node 110 via a cellular radio communication link 142. The further device 133, 134 may be comprised in a further D2D cluster of devices. The further device 133, 134 may be connected to the network node 110 via a cellular communication link 145.

The network node 110 comprises a processing circuit 410 configured to determine a threshold value based on interference information relating to interference 150, 151, 152, 153 of the first device 131. The threshold value indicates an upper limit for allowable transmit power of the first device 131 when transmitting on the D2D communication link 140.

As mentioned, the interference information may comprise information relating to at least one of a position of the first device 131, measured radio environment maps, and/or a path loss exponent indicating radio environment in the vicinity of the first device 131. The interference information may relate to co-channel interference. The interference information may indicate interference 150, 153 towards the first device 131 and/or interference 151, 152 from the first device 131. The interference information may further comprise information relating to a position of the first device 131 in relation to a position of a further device 133, 134 related to the interference 150, 151, 152, 153.

Moreover, the processing circuit 410 is configured to send the threshold value to the first device 131.

Furthermore, the processing circuit 410 is configured to receive, from the first device 131, a message indicating that power of transmission, by the first device 131, on the D2D communication link 140 exceeds the threshold value.

The processing circuit 410 may further be configured to receive the interference information from the first device 131.

The processing circuit 410 may further be configured to establish the threshold value based on the interference information, in response to reception of the message indicating that the threshold value has been exceeded.

The processing circuit 410 may be a processing unit, a processor, an Application Specific Integrated Circuit (ASIC), a field-programmable gate array (FPGA), a signal processor, a Digital Signal Processor (DSP) or the like. As an example, the processing unit or the like may comprise one or more processor kernels.

The network node 110 further comprises a transmitter 420, which may be configured to send one or more of the threshold value, and other numbers, values or parameters described herein.

The network node 110 further comprises a receiver 430, which may be configured to receive one or more of the interference information, the message indicating that the threshold is exceeded and numbers, values or parameters indicating for example successful reception at the first and/or second device 131, 132 and other numbers, values or parameters described herein.

The network node 110 further comprises a memory 440 for storing software to be executed by, for example, the processing circuit. The software may comprise instructions to enable the processing circuit to perform the method in the network node 110 as described above in conjunction with FIG. 2. The memory may be a hard disk, a magnetic storage medium, a portable computer diskette or disc, flash memory, random access memory (RAM) or the like. Furthermore, the memory may be an internal register memory of a processor.

As used herein, the term "value" may be any kind of digit, such as binary, real, imaginary or rational number or the like. Moreover, "value" may be one or more characters, such as a letter or a string of letters. "Value" may also be represented by a bit string.

Even though embodiments of the various aspects have been described, many different alterations, modifications and the like thereof will become apparent for those skilled in the art. The described embodiments are therefore not intended to limit the scope of the present disclosure.

The invention claimed is:

1. A method in a network node for managing a Device-to-Device (D2D) communication link between a first device and a second device, wherein the method comprises:
   determining a threshold value based on interference information relating to interference from and towards the first device with respect to a third device and interference from and towards the first device with respect to a fourth device, wherein the threshold value indicates an upper limit for allowable transmit power of the first device when transmitting on the D2D communication link;
   sending the threshold value to the first device; and
   receiving, from the first device, a message indicating that power of transmission, by the first device, on the D2D communication link exceeds the threshold value.

2. The method according to claim 1, wherein the interference information comprises information relating to at least one of:
   a position of the first device,
   measured radio environment maps, and/or
   a path loss exponent indicating radio environment in the vicinity of the first device.

3. The method according to claim 1, wherein the interference information relates to co-channel interference.

4. The method according to claim 1, wherein the interference information comprises information relating to a position of the first device in relation to a position of at least one further device related to the interference, wherein the at least one further device comprises at least one of the third device and the fourth device.

5. The method according to claim 4, wherein the further device is comprised in a further D2D cluster of devices.

6. The method according to claim 4, wherein the further device is connected to the network node via a cellular communication link.

7. The method according to claim 1, further comprising:
   receiving the interference information from the first device.

8. The method according claim 1, further comprising:
   in response to the reception of the message indicating that the threshold value has been exceeded, establishing the threshold value based on the interference information.

9. The method according to claim 1, wherein the network node is comprised in a cellular radio communication system.

10. The method according to claim 1, wherein the first device is comprised in a first D2D cluster managed by the network node via a cellular radio communication link.

11. The method according to claim 10, wherein the second device is comprised in the first D2D cluster, the third device is comprised in a second D2D cluster managed by the network node via a second cellular radio communication link, and the fourth device is managed by the network node via a third cellular radio communications link.

12. A network node configured to manage a Device-to-Device (D2D) communication link between a first device and a second device, wherein the network node comprises:
   a processing circuit configured to:
      determine a threshold value based on interference information relating to interference from and towards the first device with respect to a third device and interference from and towards the first device with respect to a fourth device, wherein the threshold value indicates an upper limit for allowable transmit power of the first device when transmitting on the D2D communication link;
      send the threshold value to the first device; and
      receive, from the first device, a message indicating that power of transmission, by the first device, on the D2D communication link exceeds the threshold value.

13. The network node according to claim 12, wherein the interference information comprises information relating to at least one of:
   a position of the first device,
   measured radio environment maps, and/or
   a path loss exponent indicating radio environment in the vicinity of the first device.

14. The network node according to claim 12, wherein the interference information relates to co-channel interference.

15. The network node according to claim 12, wherein the interference information comprises information relating to a position of the first device in relation to a position of at least one further device related to the interference, wherein the at least one further device comprises at least one of the third device and the fourth device.

16. The network node according to claim 15, wherein the further device is comprised in a further D2D cluster of devices.

17. The network node according to claim 15, wherein the further device is connected to the network node via a cellular communication link.

18. The network node according to claim 12, wherein the processing circuit further is configured to receive the interference information from the first device.

19. The network node according to claim 12, wherein the processing circuit further is configured to establish the threshold value based on the interference information, in response to reception of the message indicating that the threshold value has been exceeded.

20. The network node according to claim 12, wherein the network node is comprised in a cellular radio communication system.

21. The network node according to claim 12, wherein the first device is comprised in a first D2D cluster managed by the network node via a cellular radio communication link.

22. The network according to claim 21, wherein the second device is comprised in the first D2D cluster, the third device is comprised in a second D2D cluster managed by the network node via a second cellular radio communication link, and the fourth device is managed by the network node via a third cellular radio communications link.

\* \* \* \* \*